United States Patent
Miyata (10) Patent No.: US 10,098,161 B2
(45) Date of Patent: Oct. 9, 2018

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Shigeo Miyata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 65 days.

(21) Appl. No.: 15/226,543

(22) Filed: Aug. 2, 2016

(65) Prior Publication Data
US 2017/0265232 A1 Sep. 14, 2017

(30) Foreign Application Priority Data
Mar. 14, 2016 (JP) ................ 2016-049330

(51) Int. Cl.
| | |
|---|---|
| *H04W 76/10* | (2018.01) |
| *H04W 76/02* | (2009.01) |
| *H04W 4/80* | (2018.01) |
| *H04W 8/00* | (2009.01) |
| *H04W 84/18* | (2009.01) |
| *H04W 8/22* | (2009.01) |

(52) U.S. Cl.
CPC ............ *H04W 76/02* (2013.01); *H04W 4/80* (2018.02); *H04W 76/10* (2018.02); *H04W 8/005* (2013.01); *H04W 8/22* (2013.01); *H04W 84/18* (2013.01)

(58) Field of Classification Search
CPC ......... H04W 4/00; H04W 76/02; H04W 8/00; H04W 84/18
See application file for complete search history.

(56) References Cited

U.S. PATENT DOCUMENTS

| | | | | |
|---|---|---|---|---|
| 2014/0240776 A1* | 8/2014 | Suzuki | ................. | G06F 3/1296 358/1.15 |
| 2014/0308898 A1* | 10/2014 | Lee | ........................ | H04W 4/008 455/41.3 |
| 2017/0041860 A1* | 2/2017 | Ogawa | ................. | H04W 48/16 |

FOREIGN PATENT DOCUMENTS

JP 2014-168215 A 9/2014

\* cited by examiner

*Primary Examiner* — Lakeram Jangbahadur
(74) *Attorney, Agent, or Firm* — Oliff PLC (57) ABSTRACT

An information processing apparatus includes a connection information obtainer, an identification information obtainer, and a controller. The connection information obtainer is configured to obtain connection information including address information and hardware identification information of a target apparatus. The identification information obtainer is configured to obtain, from a party connected by designating the address information included in the connection information obtained by the connection information obtainer as a destination, hardware identification information of the party. The controller is configured to, if the hardware identification information included in the connection information matches the hardware identification information obtained by the identification information obtainer, determine that the party is the target apparatus and perform control to use the target apparatus.

2 Claims, 8 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-049330 filed Mar. 14, 2016.

BACKGROUND (i) Technical Field

The present invention relates to an information processing apparatus and a non-transitory computer readable medium.

(ii) Related Art

It is becoming common to use a printer from a mobile terminal via a wireless local area network (LAN). Methods for accessing a printer from a mobile terminal via a wireless LAN include a method for connecting to a LAN including a printer via a wireless access point (AP) and a method for directly communicating with a printer via a wireless LAN without using a wireless AP. The former method is called an infrastructure mode and the latter includes an ad hoc mode, Wi-Fi (registered trademark) Direct, and so forth.

Also, a method in which an IP address of a printer is transmitted from the printer to a mobile terminal through near field communication (NFC) and the mobile terminal accesses the printer via a wireless LAN by using the IP address and operates the printer, is becoming popular.

SUMMARY

According to an aspect of the invention, there is provided an information processing apparatus including a connection information obtainer, an identification information obtainer, and a controller. The connection information obtainer is configured to obtain connection information including address information and hardware identification information of a target apparatus. The identification information obtainer is configured to obtain, from a party connected by designating the address information included in the connection information obtained by the connection information obtainer as a destination, hardware identification information of the party. The controller is configured to, if the hardware identification information included in the connection information matches the hardware identification information obtained by the identification information obtainer, determine that the party is the target apparatus and perform control to use the target apparatus.

BRIEF DESCRIPTION OF THE DRAWINGS

An exemplary embodiment of the present invention will be described in detail based on the following figures, wherein.

DETAILED DESCRIPTION

Figure 1:
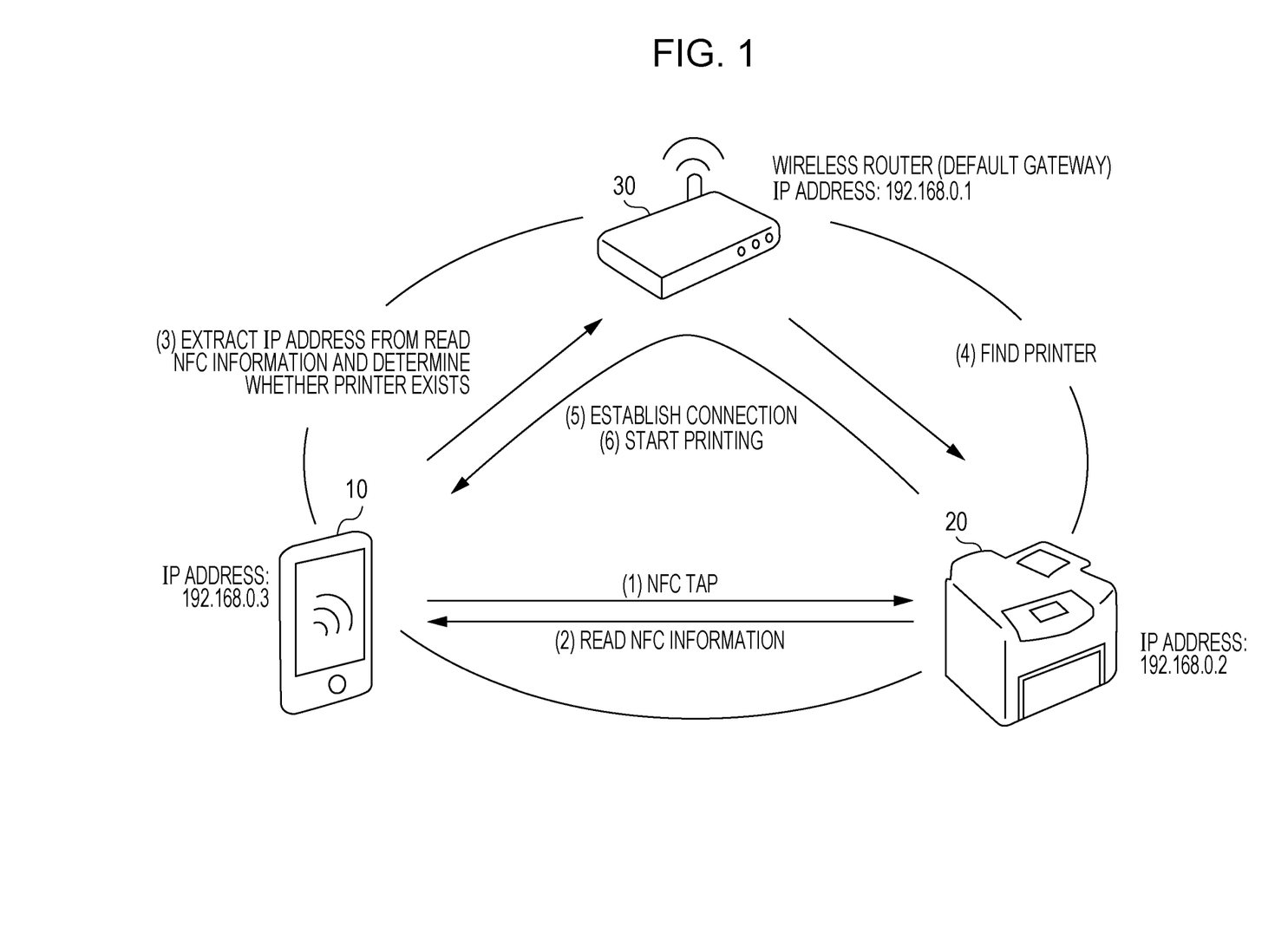
FIG. 1 is a diagram for describing a flow of a process for using a service apparatus from a mobile apparatus without using a technique according to an exemplary embodiment.

With reference to FIG. 1, a description will be given of a flow of a process for using a service apparatus from a mobile apparatus without using a technique according to an exemplary embodiment.

A mobile apparatus 10 is an information processing apparatus carried by a user and has a wireless communication function complying with a wireless local area network (LAN) standard. The mobile apparatus 10 may be, for example, a smartphone or tablet terminal.

A service apparatus 20 is an apparatus that provides several services to a user who uses a mobile apparatus and is installed in, for example, facilities such as an office and store. A description will be given below under the assumption that the service apparatus 20 is a printer as an example, but this is merely an example. The service apparatus 20 may be another type of apparatus, such as a copier, scanner, facsimile, or multifunction peripheral (an apparatus with functions for printing, scanning, copying, faxing, and so forth).

The mobile apparatus 10 and the service apparatus 20 have a function of transmitting data to and receiving data from another apparatus through near field communication (NFC). The service apparatus 20 holds connection information (hereinafter referred to as "NFC information") that is used by another apparatus to access the service apparatus 20, such as an IP address of the service apparatus 20 in a network to which the service apparatus 20 is connected (a wireless router 30 is also connected), and provides the connection information to another apparatus by using an NFC function.

The service apparatus 20 is connected to the wireless router 30, which functions as a wireless access point, via a wireless or wired LAN and is connected to the same network as the wireless router 30. In this example, the mobile apparatus 10 is wirelessly connected to the wireless router 30.

The mobile apparatus 10 of the user is wirelessly connected to the wireless router 30 that is installed in a facility.

(1) When the user wants to use the service apparatus 20 (printer), the user taps near an NFC port of the service apparatus 20 on the mobile apparatus 10.

(2) In response to the NFC tap, the NFC information held by the service apparatus 20 is transmitted to the mobile apparatus 10 through NFC.

(3) The mobile apparatus 10 tries simple network management protocol (SNMP) communication with respect to an IP address "192.168.0.2" extracted from the NFC information that has been obtained and thereby determines whether the service apparatus 20 exists at the IP address.

(4) In this example, the mobile apparatus 10 finds the service apparatus 20 (printer) through the SNMP communication that is performed via the wireless router 30.

(5) The mobile apparatus 10 registers the found service apparatus 20 as an "apparatus to be used".

(6) The mobile apparatus 10 transmits print data to the service apparatus 20 and instructs the service apparatus 20 to print the data.

FIG. 1 illustrates a case where a connection to the service apparatus 20 tapped on the mobile apparatus 10 is correctly established. In contrast, an example in which a connection to an apparatus different from the tapped service apparatus 20 is wrongly established will be described with reference to FIG. 2.

Figure 2:
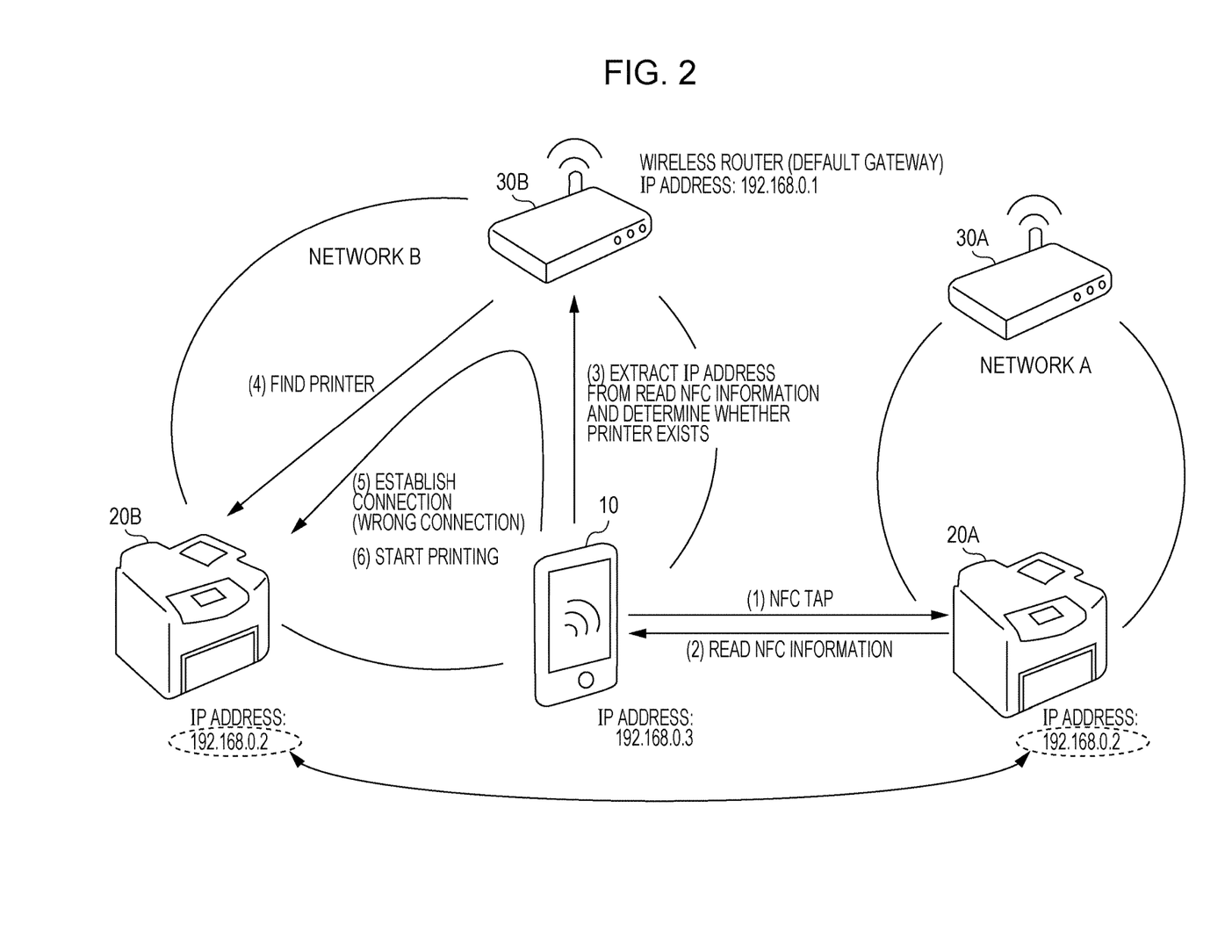
FIG. 2 is a diagram for describing a flow of a process in a case where inconvenience occurs in the method illustrated in FIG. 1.

In the example illustrated in FIG. 2, a service apparatus 20A (hereinafter also referred to as a "target apparatus") that the user wants to use is connected to a network A to which a wireless router 30A is connected, whereas the mobile apparatus 10 of the user is connected to another network B via another wireless router 30B. Both the service apparatuses 20A and 20B are printers and are assigned with the same private IP address "192.168.0.2" on the respective networks.

(1) The user taps near an NFC port of the target apparatus 20A on the mobile apparatus 10.

(2) In response to the NFC tap, the NFC information held by the target apparatus 20A is transmitted to the mobile apparatus 10 through NFC. The NFC information includes the IP address "192.168.0.2" of the target apparatus 20A.

(3) The mobile apparatus 10 tries SNMP communication with respect to the IP address "192.168.0.2" extracted from the NFC information that has been obtained. In this example, since the mobile apparatus 10 is connected to the network B and thus the communication reaches the service apparatus 20B on the network B. The service apparatus 20B is a printer, like the target apparatus 20A, and is configured to response to the SNMP communication.

(4) Accordingly, the mobile apparatus 10 finds the service apparatus 20B different from the target apparatus 20A.

(5) Thus, the mobile apparatus 10 registers the service apparatus 20B as an "apparatus to be used". The service apparatus 20B is an apparatus different from the target apparatus 20A tapped by the user. It is a highly possible that the user does not know where the service apparatus 20B is.

(6) The mobile apparatus 10 transmits print data to the service apparatus 20B and instructs the service apparatus 20B to print the data. The user expects that the data will be printed out by the target apparatus 20A in front of the user, but actually the data is printed out by the service apparatus 20B that is not intended by the user. The user is not necessarily able to recognize that his/her printed material has been output from the service apparatus 20B. If the user is not able to recognize it, the printed matter may go to waste or may get into hands of someone other than the user, resulting in information leakage.

Hereinafter, a description will be given of a method for taking measures against such an issue according to the exemplary embodiment.

In the exemplary embodiment, the NFC information held by the service apparatus 20 includes information representing a media access control (MAC) address in addition to the IP address of the service apparatus 20. The IP address is merely a logical communication address, which may be changed on each assignment of a dynamic host configuration protocol (DHCP), for example, and is not identification information unique to the service apparatus 20. In contrast, the MAC address is a physical address unique to a network communication device built in the service apparatus 20, and any other service apparatuses 20 do not basically have the same MAC address. Thus, the MAC address functions as hardware identification information unique to the service apparatus.

Figure 3:
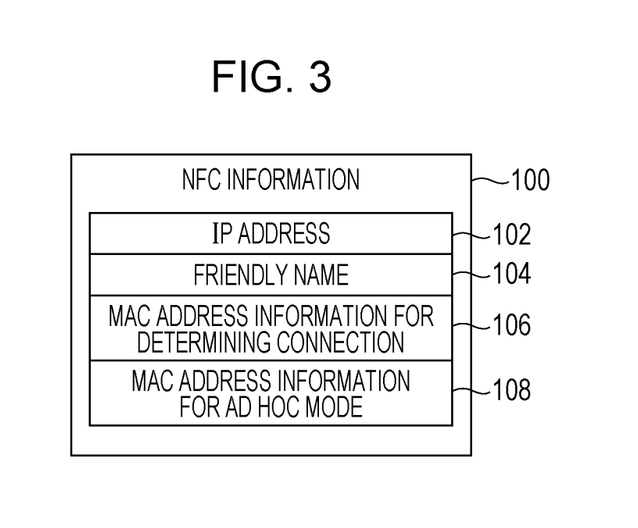
FIG. 3 is a diagram schematically illustrating the configuration of NFC information of a service apparatus according to the exemplary embodiment.

FIG. 3 illustrates an example configuration of NFC information 100 held by the service apparatus 20 according to the exemplary embodiment. In this example, the NFC information 100 includes an IP address 102, a friendly name (the name of the apparatus) 104, MAC address information for determining connection 106, and MAC address information for ad hoc mode 108 of the service apparatus 20. Among them, the IP address 102 and the friendly name 104 may be stored as records with the names "wsd.oob" and "devicepairing" among the NFC information records defined by Microsoft Corporation. "wsd.oob" is an NFC data exchange format (NDEF) record that is used for connection using a protocol specified by Microsoft Corporation, called Web Services for Devices (WSD), and includes an IP address and so forth. "devicepairing" is an NDEF record defined in pairs with "wsd.oob", and includes the nickname of the apparatus. The IP address 102 and the friendly name 104 are also included in NFC information according to the related art.

On the other hand, the MAC address information for determining connection 106 is a record that is newly introduced in the exemplary embodiment, and includes information representing the MAC address of the network communication device built in the service apparatus 20. More strictly, this MAC address is the MAC address of the device connected to the network to which both the service apparatus 20 and the wireless router 30 are connected, among the network communication devices included in the service apparatus 20. From another point of view, the MAC address information for determining connection 106 represents the MAC address of the network communication device that responds to a MAC address request using an address resolution protocol (ARP) from the mobile apparatus 10 via the wireless router 30. For example, if the service apparatus 20 is connected using a LAN cable to the LAN to which the wireless router 30 is connected, the MAC address of the network interface connected to the LAN cable is used as the MAC address information for determining connection 106. If the service apparatus 20 participates in the LAN by wirelessly connecting to the wireless router 30, the MAC address of the wireless LAN module used for the wireless connection is used as the MAC address information for determining connection 106.

The NFC information 100 of the service apparatus 20 may also include the MAC address information for ad hoc mode 108, which includes information representing the MAC address to be used for establishing a direct wireless LAN connection to another apparatus without via the wireless router 30, for example, in an ad hoc mode or Wi-Fi Direct, and password information for establishing a connection in the ad hoc mode.

The MAC address represented by the MAC address information for ad hoc mode 108 may or may not match the MAC address represented by the MAC address information for determining connection 106. For example, if the service apparatus 20 performs a direct wireless connection in the ad hoc mode or the like by using a wireless LAN module that is used for participating in the LAN through a wireless connection to the wireless router 30, the MAC address represented by the MAC address information for ad hoc mode 108 matches the MAC address represented by the MAC address information for determining connection 106. On the other hand, if the service apparatus 20 is connected to the LAN of the wireless router 30 via a network interface different from the wireless LAN module that is used for a direct wireless connection in the ad hoc mode or the like, the MAC address represented by the MAC address information for ad hoc mode 108 does not match the MAC address represented by the MAC address information for determining connection 106.

The password for an ad hoc mode connection included in the MAC address information for ad hoc mode 108 may be protected by encrypting it.

The NFC information 100 of the service apparatus 20 may include items other than the items 102 to 108 illustrated in FIG. 3.

Figure 4:
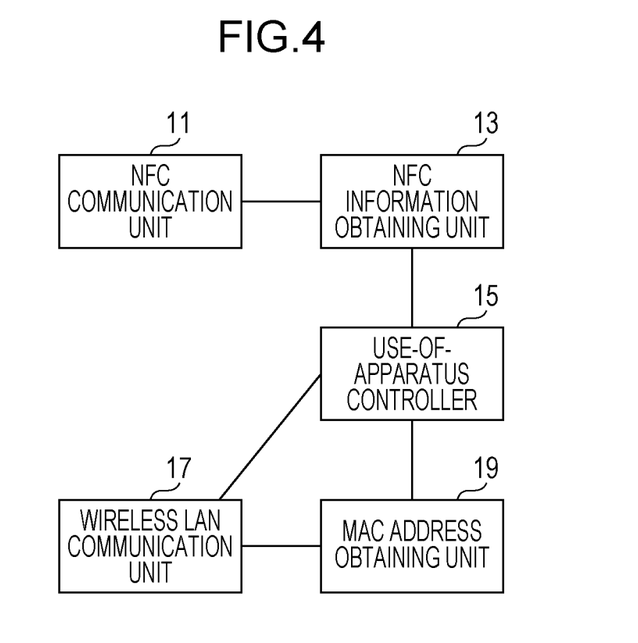
FIG. 4 is a diagram illustrating an example of a system of a mobile apparatus for using a service apparatus via a wireless LAN.

The mobile apparatus 10 includes the system illustrated in FIG. 4 to use the service apparatus 20 via a wireless LAN. The system includes an NFC communication unit 11, an NFC information obtaining unit 13, a use-of-apparatus controller 15, a wireless LAN communication unit 17, and a MAC address obtaining unit 19.

The NFC communication unit 11 is a hardware module that executes data communication complying with the NFC standard with another NFC-compatible apparatus. The NFC information obtaining unit 13 is a software module that obtains NFC information from another apparatus by controlling the NFC communication unit 11. The use-of-apparatus controller 15 is a software module that controls the service apparatus 20 and performs processing for a user interface for the control. The wireless LAN communication unit 17 is a hardware module that performs communication complying with the wireless LAN standard. The MAC address obtaining unit 19 is a software module that obtains information such as a MAC address from an apparatus on the LAN connected by using the wireless LAN communication unit 17. Among these units, the software modules are implemented when a central processing unit (CPU) of the mobile apparatus 10 executes the respective modules stored in a storage included in the mobile apparatus 10.

Next, a description will be given of a process in which the mobile apparatus 10 establishes a connection to the service apparatus 20A as a target in the exemplary embodiment with reference to FIGS. 5 and 6.

Figure 5:
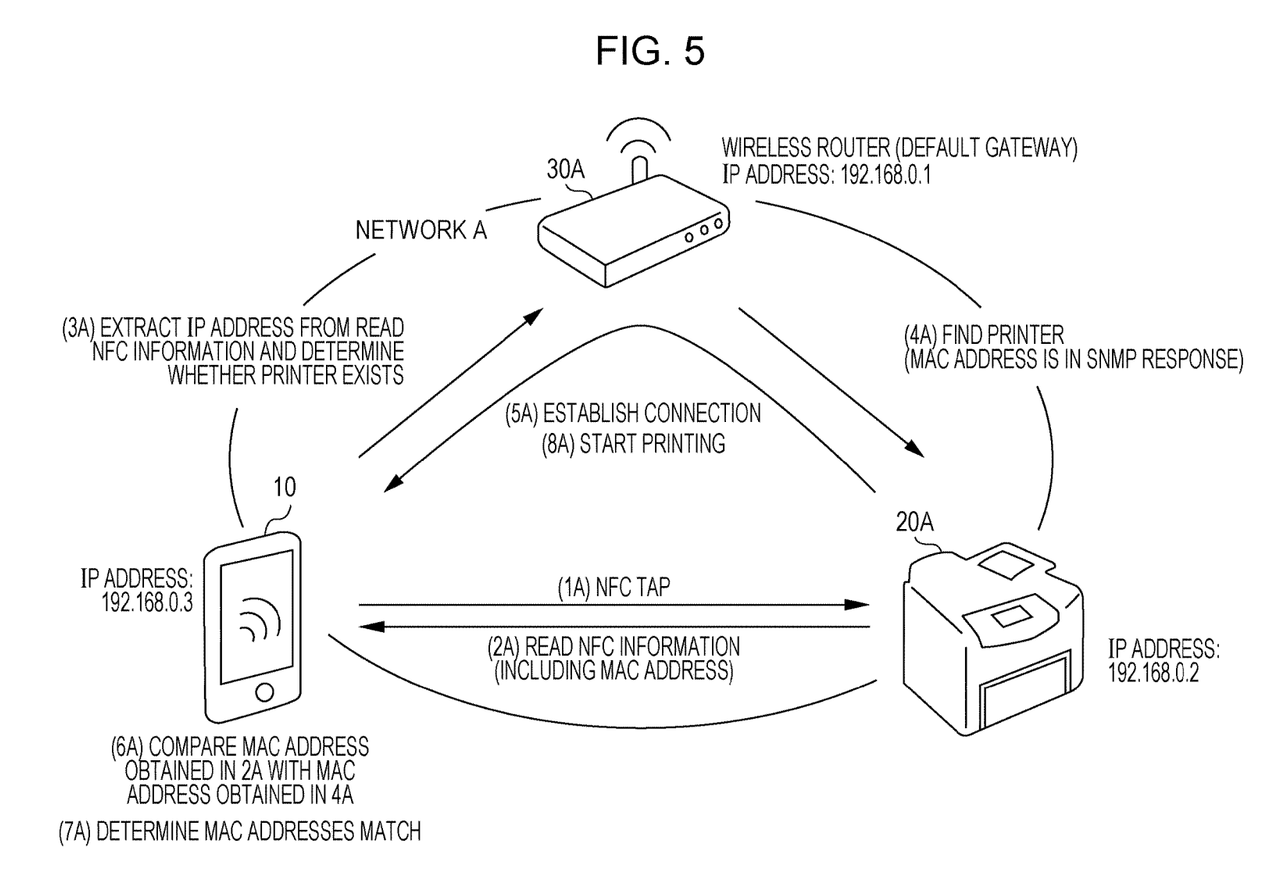
FIG. 5 is a diagram for describing a flow of a process for using a service apparatus from a mobile apparatus in the exemplary embodiment.

FIG. 5 illustrates an example in which the mobile apparatus 10 of the user is connected to, via the wireless router 30A, the network A to which the service apparatus (target apparatus) 20A to be used by the user belongs.

(1A) The user taps near an NFC port of the service apparatus (target apparatus) 20A to be used on the mobile apparatus 10.

(2A) In response to the NFC tap, the NFC communication unit 11 of the mobile apparatus 10 communicates with an NFC communication module of the service apparatus 20A and thereby receives the NFC information held by the service apparatus 20A. The NFC information obtaining unit 13 obtains the NFC information and supplies it to the use-of-apparatus controller 15. The NFC information includes the records of the individual items illustrated in FIG. 3, which include information representing the MAC address of the target apparatus 20A (the MAC address information for determining connection 106).

(3A) The use-of-apparatus controller 15 of the mobile apparatus 10 supplies the IP address "192.168.0.2" extracted from the NFC information to the MAC address obtaining unit 19. The MAC address obtaining unit 19 tries SNMP communication with respect to the IP address and determines whether a response returns from the IP address.

(4A) In this example, an SNMP response is returned from the target apparatus 20A and the target apparatus 20A is found. The response includes the ID information (for example, sysOID) and information representing the MAC address of the target apparatus 20A. This MAC address is the MAC address of the communication module that is included in the target apparatus 20A and that is communicating with the network A. The MAC address obtaining unit 19 extracts the MAC address from the SNMP response and supplies the MAC address to the use-of-apparatus controller 15.

(5A) The use-of-apparatus controller 15 establishes a communication connection to the target apparatus 20A that has been found. In this stage, the target apparatus 20A is not registered as an "apparatus to be used".

(6A) The use-of-apparatus controller 15 compares the MAC address represented by the MAC address information for determining connection 106 obtained in the foregoing (2A) with the MAC address obtained in the foregoing (4A). If both the MAC addresses match, it is determined that the apparatus that returns the response from the IP address used in the SNMP communication in the foregoing (4A) is identical to the target apparatus 20A tapped in the foregoing (1A).

(7A) In this example, the MAC addresses compared with each other in the foregoing (6A) match. Thus, the use-of-apparatus controller 15 registers the apparatus having the IP address as the destination of the SNMP communication as an "apparatus to be used", and after that communicates with the apparatus to perform settings for printing and transmit print data.

(8A) The use-of-apparatus controller 15 transmits print data to the target apparatus 20A and instructs the target apparatus 20A to print the data.

Figure 6:
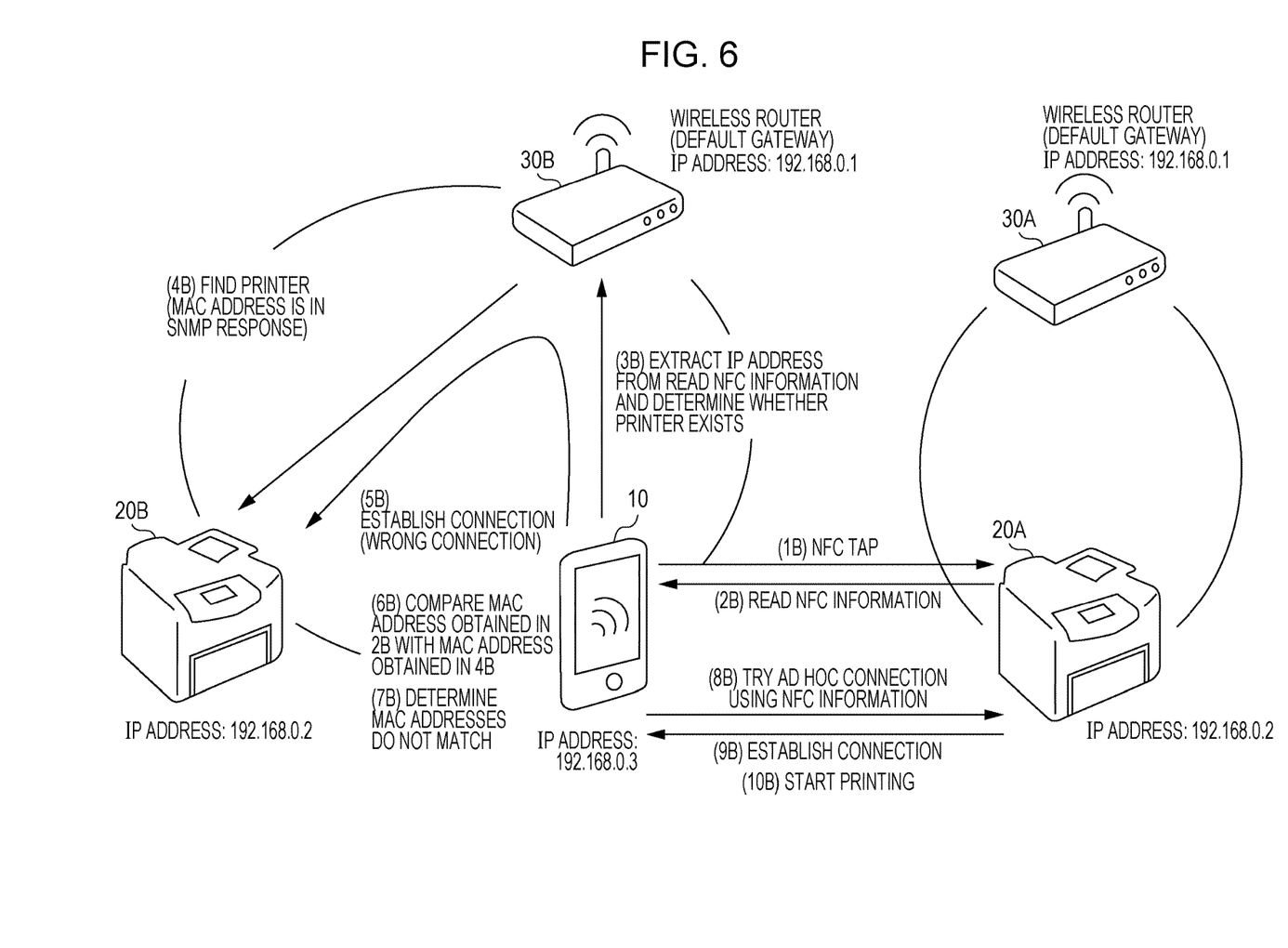
FIG. 6 is a diagram for describing a flow of a process of the mobile apparatus according to the exemplary embodiment in the same situation as that illustrated in FIG. 2.

FIG. 6 illustrates an example in which the mobile apparatus 10 of the user is connected to, via the wireless router 30B, the network B different from the network A to which the target apparatus 20A belongs (infrastructure mode), and the service apparatus 20B having the same IP address as the target apparatus 20A exists on the network B.

(1B) The user taps near an NFC port of the target apparatus 20A on the mobile apparatus 10.

(2B) In response to the NFC tap, the NFC communication unit 11 of the mobile apparatus 10 receives the NFC information of the target apparatus 20A from an NFC communication module of the service apparatus 20A. The NFC information obtaining unit 13 obtains the NFC information and supplies it to the use-of-apparatus controller 15. The NFC information includes the records of the individual items illustrated in FIG. 3. In particular, the NFC information includes the IP address 102 (the value is "192.168.0.2") and the MAC address information for determining connection 106 of the target apparatus 20A.

(3B) The use-of-apparatus controller 15 supplies the IP address "192.168.0.2" extracted from the NFC information to the MAC address obtaining unit 19. The MAC address obtaining unit 19 tries SNMP communication with respect to the IP address and determines whether a response returns from the IP address. The SNMP communication reaches the service apparatus 20B on the network B from the wireless LAN communication unit 17 via the wireless router 30B that the mobile apparatus 10 is currently accessing in the infrastructure mode.

(4B) Thus, in this example, an SNMP response is returned from the service apparatus 20B and the service apparatus 20B is found. This response includes the ID information and the information representing the MAC address of the service apparatus 20B. Since the service apparatus 20B is an apparatus different from the target apparatus 20A, the MAC address included in the response is different from the MAC address of the target apparatus 20A. The MAC address obtaining unit 19 extracts the MAC address from the SNMP response and supplies the MAC address to the use-of-apparatus controller 15.

(5B) The use-of-apparatus controller 15 establishes a communication connection to the service apparatus 20B that has been found. In this stage, however, the service apparatus 20B is not registered as an "apparatus to be used".

(6B) The use-of-apparatus controller 15 compares the MAC address represented by the MAC address information for determining connection 106 obtained in the foregoing (2B) with the MAC address obtained in the foregoing (4B).

(7B) In this example, the former MAC address is of the target apparatus 20A whereas the latter MAC address is of the service apparatus 20B, and thus both the MAC addresses do not match. Thus, the use-of-apparatus controller 15 determines that the partner of the SNMP communication wirelessly connected in the infrastructure mode is not the target apparatus 20A.

(8B) In this case, the use-of-apparatus controller 15 does not register the service apparatus 20B, which is the partner of the SNMP communication, as an "apparatus to be used", and does not communicate with the service apparatus 20B any more. Instead, the use-of-apparatus controller 15 tries to connect to the target apparatus 20A through direct wireless communication in the ad hoc mode (or Wi-Fi Direct).

That is, the use-of-apparatus controller 15 determines whether the NFC information obtained in the foregoing (2B) includes the MAC address information for ad hoc mode 108 (see FIG. 3). If the NFC information includes the MAC address information for ad hoc mode 108, the use-of-apparatus controller 15 extracts a MAC address and an encrypted password from the information and decrypts the password. The use-of-apparatus controller 15 then examines information about the individual wireless access points that are currently detected by the wireless LAN communication unit 17 and searches for, among these access points, an access point that has a value of a basic service set identifier (BSSID) identical to the MAC address represented by the MAC address information for ad hoc mode 108. The standard of the wireless LAN defines that the MAC address of a wireless communication module is used as the BSSID of the wireless LAN module. If the wireless LAN module built in the target apparatus 20A operates as a wireless access point, the wireless access point of the target apparatus 20A is found in the search, and the BSSID thereof matches the MAC address represented by the MAC address information for ad hoc mode 108 extracted from the NFC information. Thus, the use-of-apparatus controller 15 is able to find the wireless access point built in the target apparatus 20A and instructs the wireless LAN communication unit 17 to establish a direct wireless LAN connection to the wireless access point in the ad hoc mode or the like.

If the NFC information obtained in the foregoing (2B) does not include the MAC address information for ad hoc mode 108 (see FIG. 3), or if the target apparatus 20A does not have a wireless access point function (and thus is not detected), the use-of-apparatus controller 15 displays an error message on the screen of the mobile apparatus 10. For example, a message "cannot wirelessly connect to the tapped apparatus" is displayed.

(9B) In the example illustrated in FIG. 6, a direct wireless connection to the target apparatus 20A is able to be established. In this case, the use-of-apparatus controller 15 performs SNMP communication through the wireless connection, determines that the partner of the communication is an intended service apparatus, and registers the service apparatus (target apparatus 20A) as an "apparatus to be used".

(10B) The use-of-apparatus controller 15 transmits print data to the target apparatus 20A through direct wireless communication and instructs the target apparatus 20A to print the data.

Next, as a modification example of the above-described exemplary embodiment, a description will be given of a method for determining whether or not a wirelessly connected apparatus is the target apparatus 20A more quickly than in the examples described above with reference to FIGS. 5 and 6.

Figure 7:
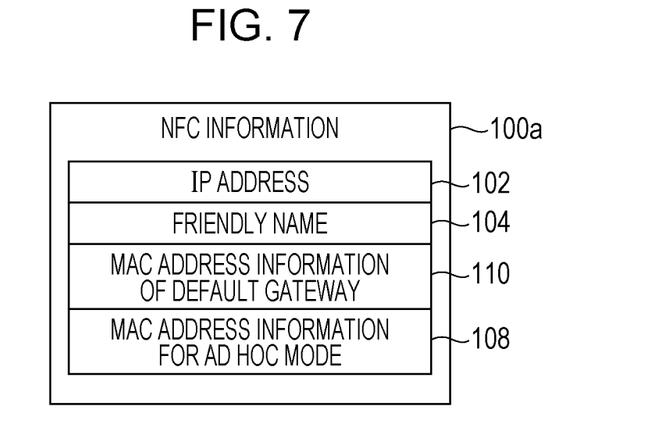
FIG. 7 is a diagram schematically illustrating the configuration of NFC information of a service apparatus according to a modification example.

In this modification example, the service apparatus 20 (20A, 20B) has the NFC information 100a illustrated in FIG. 7. As is understood in comparison with FIG. 3, the NFC information 100a illustrated in FIG. 7 includes MAC address information of default gateway 110 instead of the MAC address information for determining connection 106 in the NFC information 100 illustrated in FIG. 3.

The MAC address information of default gateway 110 is the MAC address of the default gateway of the network to which the service apparatus 20 is connected. For example, an apparatus serving as a default gateway, such as the wireless router 30A on the network to which the service apparatus 20A is connected, is predetermined. The MAC address of this apparatus is included, as the MAC address information of default gateway 110, in the NFC information 100a.

Figure 8:
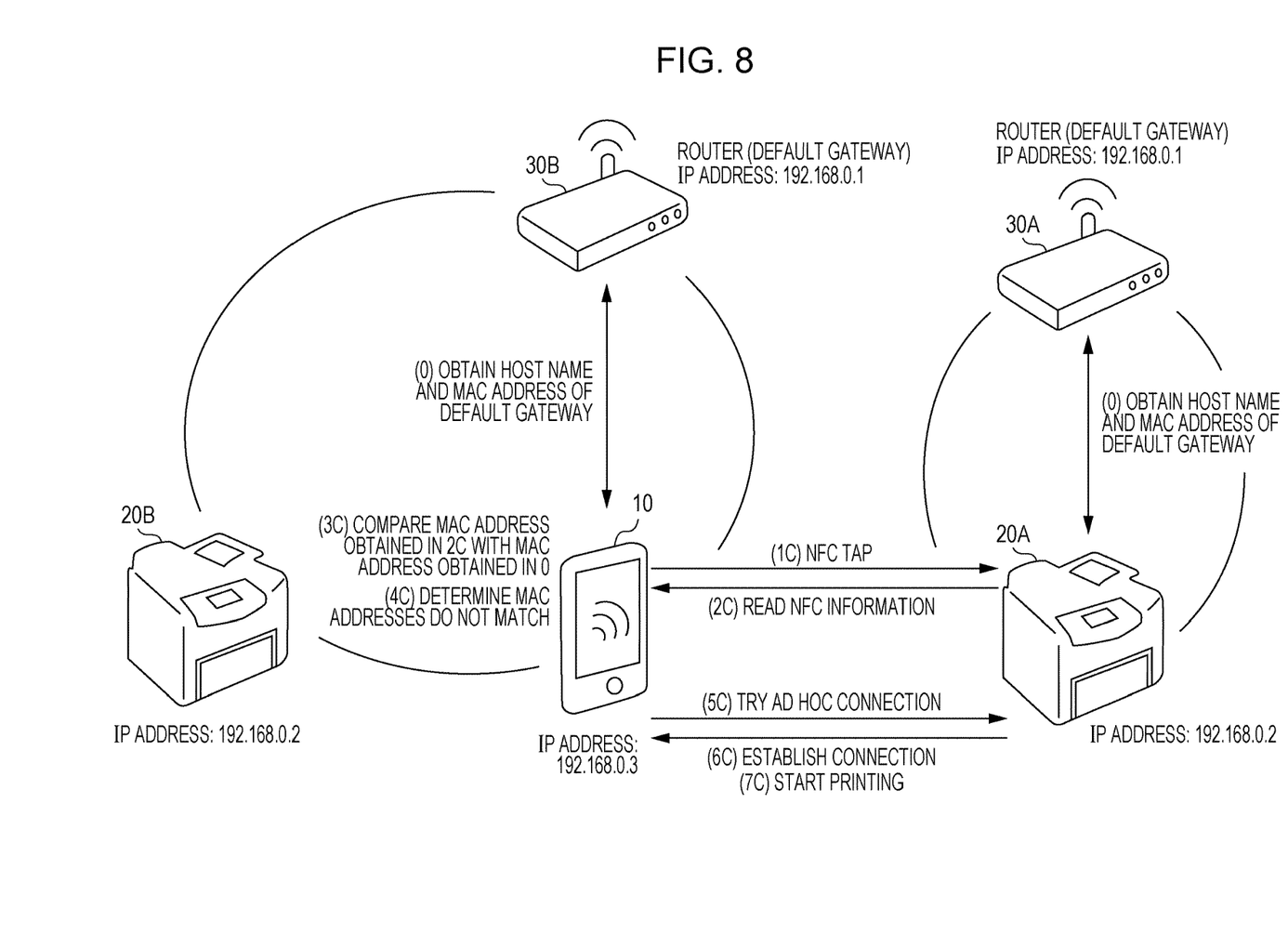
FIG. 8 is a diagram for describing a flow of a process of a mobile apparatus according to the modification example in the same situation as that illustrated in FIG. 2.

FIG. 8 illustrates an example of a flow of a process according to the modification example. In the example illustrated in FIG. 8, as in the example illustrated in FIG. 6, the mobile apparatus 10 of the user is connected to, via the wireless router 30B, the network B different from the network A to which the target apparatus 20A belongs.

(0) In this example, each of the mobile apparatus 10, the target apparatus 20A, and the service apparatus 20B obtains the host name and MAC address of the default gateway from the wireless router 30A or 30B upon connection to the network A or B, and sets the host name and MAC address as information of the own default gateway. At this time, the service apparatuses 20A and 20B incorporate the obtained host name and MAC address, which correspond to the MAC address information of default gateway 110, into the own NFC information.

(1C) The user taps near an NFC port of the target apparatus 20A on the mobile apparatus 10.

(2C) In response to the NFC tap, the mobile apparatus 10 receives the NFC information of the target apparatus 20A. The NFC information includes the records of the individual items illustrated in FIG. 7. In particular, the NFC information includes the IP address 102 (the value is "192.168.0.2") and the MAC address information of default gateway 110 of the target apparatus 20A.

(3C) The use-of-apparatus controller 15 compares the MAC address information of default gateway 110 extracted from the NFC information obtained in the foregoing (2C) with the MAC address of the default gateway of the network to which the mobile apparatus 10 is connected, obtained in the foregoing (0).

(4C) In this example, the network B to which the mobile apparatus 10 is connected is different from the network A to which the target apparatus 20A is connected. Thus, the apparatuses of both the default gateways are different from each other, and the MAC addresses thereof are different from each other. Thus, the two MAC addresses compared in the foregoing (3C) do not match. In this case, the use-of-apparatus controller 15 determines that the mobile apparatus 10 is not able to communicate with the target apparatus 20A via a wireless LAN in the infrastructure mode (because the mobile apparatus 10 is connected to the network B to which the target apparatus 20A is not connected).

(5C) In this case, the use-of-apparatus controller 15 does not perform SNMP communication via the wireless router 30B with respect to the IP address obtained through the NFC tap in the foregoing (1C) and tries to connect to the target apparatus 20A through direct wireless communication in the ad hoc mode or the like. The flow of a process for direct wireless connection may be the same as that described above with reference to FIG. 6 (8B).

(6C) In the example illustrated in FIG. 8, the mobile apparatus 10 is able to establish a direct wireless connection to the target apparatus 20A. In this case, the use-of-apparatus controller 15 performs SNMP communication through the wireless connection, determines that the partner of the communication is the intended service apparatus, and registers the service apparatus (target apparatus 20A) as an "apparatus to be used".

(7C) The use-of-apparatus controller 15 transmits print data to the target apparatus 20A through direct wireless communication and instructs the target apparatus 20A to print the data.

When the mobile apparatus 10 is connected to the network A to which the target apparatus 20A is connected, the two MAC addresses match in the determination performed in the foregoing (4C). In this case, the use-of-apparatus controller 15 of the mobile apparatus 10 performs SNMP communication through a wireless LAN connection in the infrastructure mode with respect to the IP address obtained through the NFC tap in the foregoing (1C), and thereby detects that the intended service apparatus (target apparatus 20A) exists at the IP address. The use-of-apparatus controller 15 then sets the target apparatus 20A as an "apparatus to be used", and after that communicates with the target apparatus 20A through the wireless LAN connection in the infrastructure mode to perform print settings and transmit print data.

Figure 9:
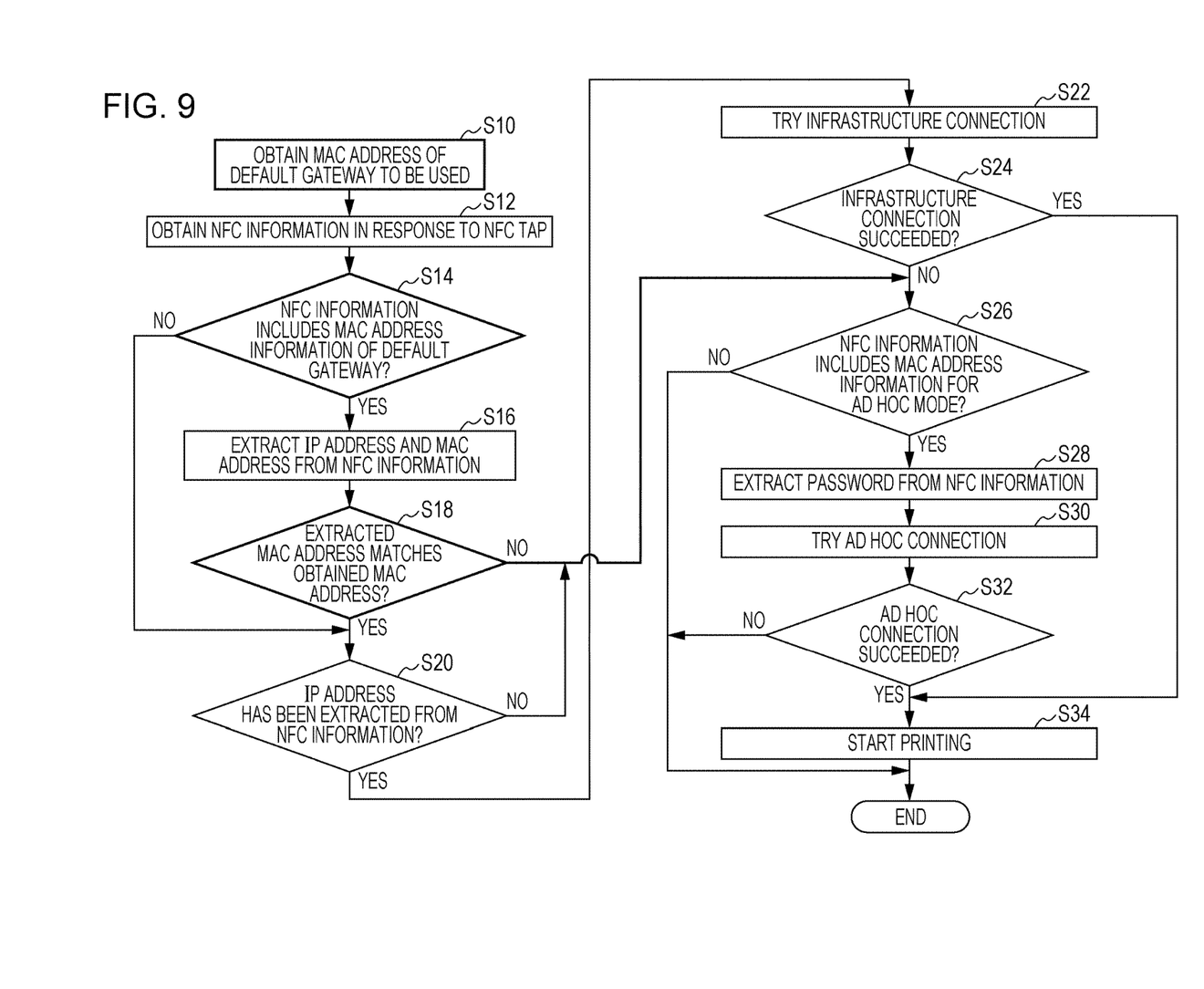
FIG. 9 is a diagram illustrating an example of a process procedure executed by the mobile apparatus according to the modification example.

FIG. 9 illustrates an example of the process procedure of the use-of-apparatus controller 15 of the mobile apparatus 10 according to the modification example.

In the procedure illustrated in FIG. 9, upon participation of the mobile apparatus 10 in a network, the use-of-apparatus controller 15 obtains the MAC address of the default gateway to be used by the mobile apparatus 10 from the network, for example, from a wireless router, and stores the MAC address (S10: (0) in FIG. 8). After that, when the target apparatus 20A is tapped on the mobile apparatus 10, the use-of-apparatus controller 15 obtains the NFC information from the target apparatus 20A (S12: (1C) in FIG. 8). Subsequently, the use-of-apparatus controller 15 determines whether the obtained NFC information includes the MAC address information of default gateway 110 illustrated in FIG. 7 (S14). If the NFC information includes the MAC address information of default gateway 110, the use-of-apparatus controller 15 extracts the IP address 102 and the MAC address information of default gateway 110 from the NFC information (S16). Subsequently, the use-of-apparatus controller 15 determines whether the extracted MAC address information of default gateway 110 matches the MAC address of the default gateway stored in step S10 (S18). If both the MAC addresses match, the use-of-apparatus controller 15 determines whether the IP address 102 has been extracted from the NFC information (S20). If the IP address 102 has been extracted, the use-of-apparatus controller 15 tries to connect to the IP address through SNMP communication or the like by using the wireless LAN connection in the infrastructure mode that is currently used for connection to the network (S22), and determines whether the connection has been successfully established, that is, whether an SNMP response has been received and whether the response indicates the target apparatus 20A (S24). If the connection has been successfully established, the use-of-apparatus controller 15 starts a process for printing by using the connection in the infrastructure mode (S34).

If the infrastructure connection in step S22 fails for some reasons, the mobile apparatus 10 is not able to communicate with the target apparatus 20A via that connection. In this case, the use-of-apparatus controller 15 determines whether or not the NFC information obtained in step S12 includes the MAC address information for ad hoc mode 108 (S26). If the NFC information does not include the MAC address information for ad hoc mode 108, both the connection in the infrastructure mode via the wireless router and the direct wireless LAN connection in the ad hoc mode are impossible, and thus an error message or the like is displayed and the process ends. If the NFC information includes the MAC address information for ad hoc mode 108, the use-of-apparatus controller 15 extracts the MAC address and password for the ad hoc connection from the information (S28), and tries the ad hoc connection to the target apparatus 20A by using the extracted information (S30). The use-of-apparatus controller 15 determines whether the ad hoc connection has successfully been established (S32). If the ad hoc connection has successfully been established, the use-of-apparatus controller 15 starts a process for printing by using the connection (S34). If the ad hoc connection fails, the use-of-apparatus controller 15 displays an error message or the like and ends the process.

If the NFC information does not include the MAC address information of default gateway 110 in step S14, the use-of-apparatus controller 15 proceeds to step S20. In this case, if the IP address 102 has been extracted from the NFC information, the use-of-apparatus controller 15 tries to connect to the target apparatus 20A through an infrastructure connection by using the IP address (S22). Here, if the NFC information of the target apparatus 20A further includes the MAC address information for determining connection 106 illustrated in FIG. 3, the methods according to the exemplary embodiment illustrated in FIGS. 5 and 6 are applicable to the modification example. That is, the use-of-apparatus controller 15 compares, when trying the infrastructure connection in step S22, the MAC address included in the SNMP response from the apparatus having the IP address with the MAC address information for determining connection 106. If both do not match, the use-of-apparatus controller 15 determines that the apparatus is not the target apparatus 20A, proceeds to step S26, and tries a connection in the ad hoc mode.

If the MAC address of the default gateway obtained from the network to which the mobile apparatus 10 is connected does not match the MAC address information of default gateway 110 extracted from the NFC information in step S18, the use-of-apparatus controller 15 proceeds to step S26 and tries a connection in the ad hoc mode.

In the modification example described above with reference to FIGS. 7 to 9, the NFC information held by the service apparatus 20A includes the MAC address information of default gateway 110 of the network to which the service apparatus 20A is connected. However, the information included in the NFC information held by the service apparatus 20A is not limited to the MAC address information of default gateway 110. The NFC information may include, instead of the MAC address information of default gateway 110, information representing the MAC address of a specific apparatus other than the default gateway connected to the network to which the service apparatus 20A is connected. The apparatus other than the default gateway may be an apparatus that operates while the network is operating, like the default gateway.

In this case, when the mobile apparatus 10 participates in a network through wireless access, the use-of-apparatus controller 15 of the mobile apparatus 10 obtains MAC addresses from all the apparatuses connected to the network by using an ARP or the like and stores the MAC addresses. Also, the use-of-apparatus controller 15 extracts the MAC address of a specific apparatus from the NFC information that is obtained when the NFC port of the target apparatus 20A is tapped on the mobile apparatus 10, and determines whether the extracted MAC address matches any one of the MAC addresses that have been obtained and stored. If the mobile apparatus 10 and the target apparatus 20A are connected to the same network, a MAC address that matches the MAC address extracted from the NFC information is found from among the MAC addresses that have been obtained and stored. Thus, if a MAC address that matches the extracted MAC address is found, the use-of-apparatus controller 15 may establish a connection to the target apparatus 20A through the current wireless connection in the infrastructure mode and may instruct the target apparatus 20A to perform printing. On the other hand, if a MAC address that matches the extracted MAC address is not found, the mobile apparatus 10 is connected in the infrastructure mode to a network different from the network to which the target apparatus 20A is connected, and thus the mobile apparatus 10 is not able to communicate with the target apparatus 20A via the connection in the infrastructure mode. In this case, for example, the use-of-apparatus controller 15 may try a connection in the ad hoc mode.

In the case of using the MAC address of an apparatus other than the default gateway, it takes time and effort to collect the MAC addresses of all the apparatuses on the network. In contrast, the MAC address of the default gateway may be easily obtained from the network.

The exemplary embodiment and modification example of the present invention have been described above. The parts that execute software processing of the above-described mobile apparatus 10 and the service apparatuses 20, 20A, and 20B are implemented by causing a computer to execute programs representing the functions of these apparatuses. Here, the computer has a circuit configuration as hardware in which a microprocessor such as a CPU, a memory (primary storage) such as a random access memory (RAM) and a read only memory (ROM), a controller that controls a fixed storage device such as a hard disk drive (HDD) or a solid state drive (SSD), various types of input/output (I/O) interfaces, and a network interface that performs control to establish a connection to a network such as a LAN are connected to one another via a bus or the like. The bus may be connected to, via an I/O interface, for example, a disc drive for reading data from and/or writing data on a portable disc recording medium such as a CD or DVD, a memory reader/writer for reading data from and/or writing data on a portable nonvolatile recording medium of various standards such as a flash memory, and the like. The programs describing the processes performed by the above-described functional modules are stored in a fixed storage device such as an HDD and are installed in the computer via a recording medium such as a CD or DVD or via a communication medium such as a network. The programs stored in the fixed storage device are read into the RAM and are executed by the microprocessor such as a CPU, and thereby the above-described functional modules are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
  a processor configured to function as:
  an identification information obtainer configured to obtain hardware identification information of a specific apparatus on a network to which the information processing apparatus is connected, wherein the specific apparatus is a default gateway of the network, and the identification information obtainer obtains and stores, when a connection to a network is established, hardware identification information of the default gateway of the network;
  a connection information obtainer configured to obtain connection information including address information of a target apparatus and hardware identification information of a specific apparatus on a network to which the target apparatus is connected, wherein the connection information further includes second hardware identification information, which is hardware identification information of a communication device that is built in the target apparatus and that is used by the target apparatus to perform direct wireless communication with another apparatus; and
  a controller configured to:
  determine, when the connection information obtainer obtains the connection information, whether or not the hardware identification information of the default gateway included in the connection information matches the hardware identification information obtained and stored by the identification information obtainer,
  if the hardware identification information obtained by the identification information obtainer matches the hardware identification information of the specific apparatus included in the connection information obtained by the connection information obtainer, determine that the address information indicates the target apparatus and perform control to use the target apparatus by using the address information, and
  if the hardware identification information included in the connection information does not match the hardware identification information obtained by the identification information obtainer, the controller establishes direct wireless communication with the target apparatus by using the second hardware identification information included in the connection information and performs control to use the target apparatus through the direct wireless communication.

2. A non-transitory computer readable medium storing a program causing a computer to execute a process, the process comprising:

obtaining hardware identification information of a specific apparatus on a network to which an information processing apparatus is connected, wherein the specific apparatus is a default gateway of the network, and obtaining hardware identification information of a specific apparatus on a network comprises obtaining and storing, when a connection to a network is established, hardware identification information of the default gateway of the network;

obtaining connection information including address information of a target apparatus and hardware identification information of a specific apparatus on a network to which the target apparatus is connected, wherein the connection information further includes second hardware identification information, which is hardware identification information of a communication device that is built in the target apparatus and that is used by the target apparatus to perform direct wireless communication with another apparatus;

determining, when the connection information is obtained, whether or not the hardware identification information of the default gateway included in the connection information matches the obtained and stored hardware identification information;

if the hardware identification information that has been obtained matches the hardware identification information of the specific apparatus included in the connection information that has been obtained, determining that the address information indicates the target apparatus and performing control to use the target apparatus by using the address information; and if the hardware identification information that has been obtained does not match the obtained hardware identification information of the specific apparatus included in the connection information, establishing direct wireless communication with the target apparatus by using the second hardware identification information included in the connection information and performing control to use the target apparatus through the direct wireless communication.

* * * * *